United States Patent
An et al.

(10) Patent No.: US 11,034,306 B2
(45) Date of Patent: Jun. 15, 2021

(54) HALF-MOVABLE CONSOLE FOR VEHICLE

(71) Applicants: HYUNDAI MOTOR COMPANY, Seoul (KR); KIA MOTORS CORPORATION, Seoul (KR)

(72) Inventors: Hyeon Ju An, Suwon-si (KR); Byung Seok Kong, Gunpo-si (KR); Sung Sik Choi, Suwon-si (KR); Eun Il Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 82 days.

(21) Appl. No.: 16/590,572

(22) Filed: Oct. 2, 2019

(65) Prior Publication Data
US 2020/0406823 A1 Dec. 31, 2020

(30) Foreign Application Priority Data
Jun. 28, 2019 (KR) .................. 10-2019-0077481

(51) Int. Cl.
*B60R 7/04* (2006.01)
*B60N 3/00* (2006.01)
*B60N 2/75* (2018.01)
*B60N 3/10* (2006.01)

(52) U.S. Cl.
CPC .............. *B60R 7/04* (2013.01); *B60N 2/75* (2018.02); *B60N 3/001* (2013.01); *B60N 3/102* (2013.01)

(58) Field of Classification Search
CPC ........... B62D 65/14; B60R 7/04; B60R 11/00; B60R 13/0262; B60R 2011/0007
USPC ....................................................... 296/37.8
See application file for complete search history.

(56) References Cited

U.S. PATENT DOCUMENTS

| | | | | |
|---|---|---|---|---|
| 5,372,403 A | * | 12/1994 | Puerto | A47C 1/03 297/188.17 |
| 6,932,402 B2 | * | 8/2005 | Niwa | B60R 7/04 296/24.34 |
| 10,829,054 B2 | * | 11/2020 | Vanel | B60R 7/04 |
| 2004/0080173 A1 | * | 4/2004 | Niwa | B60N 2/773 296/24.34 |
| 2007/0262632 A1 | * | 11/2007 | Cody | B60N 2/773 297/411.35 |
| 2010/0156131 A1 | * | 6/2010 | D'Alessandro | B60R 7/04 296/37.8 |
| 2016/0003275 A1 | * | 1/2016 | An | B60N 2/793 403/322.4 |
| 2016/0375810 A1 | * | 12/2016 | Kong | B60N 2/793 297/145 |
| 2018/0099591 A1 | * | 4/2018 | Choi | B60N 2/793 |

(Continued)

*Primary Examiner* — Pinel E Romain
(74) *Attorney, Agent, or Firm* — McDonnell Boehnen Hulbert & Berghoff LLP (57) ABSTRACT

A half-movable console for a vehicle is provided. The half-movable console includes a base console fixedly mounted to a floor panel, a moving console coupled to a top of the base console such that the moving console is slidable in forward and rearward directions, and a protector disposed at a front side of the moving console while being mounted to the base console such that the protector is movable in the forward and rearward directions while being adjustable in tilting angle. In accordance with this configuration, the half-movable console is usable for various purposes within a limited passenger compartment in the vehicle.

11 Claims, 12 Drawing Sheets

(56) References Cited

U.S. PATENT DOCUMENTS

2019/0184876 A1* 6/2019 Mullen ................... B60R 7/04
2019/0381943 A1* 12/2019 Hornischer ............ E05D 15/22

* cited by examiner

Cross-section taken along line A-A

FIG. 5B

Cross-section taken along line B-B

Securing of Passageway

HALF-MOVABLE CONSOLE FOR VEHICLE

CROSS REFERENCE TO RELATED APPLICATION

This application claims priority, under 35 U.S.C. § 119(a), to Korean Patent Application No. 10-2019-0077481 filed on Jun. 28, 2019, the entire contents of which are incorporated herein by reference.

BACKGROUND

(a) Technical Field

The present disclosure relates to a half-movable console for a vehicle, and more particularly to a half-movable console for a vehicle having a structure linearly movable to a use position in a front seat space and a use position in a rear seat space, thereby being usable for various purposes within a limited passenger compartment in the vehicle.

(b) Background Art

As is well known, a console for a vehicle is fixedly mounted in the vehicle between a driver seat and a front passenger seat, to be used for storage of various articles therein. An armrest, on which a driver's arm or a passenger's arm can rest, is mounted on the top of the console, to open or close the console.

However, although the console is a convenience device occupying a large portion of the passenger compartment, there are drawbacks in that the console exhibits degraded spatial utility and degraded functional utility, and passengers in rear seats cannot directly use the console because the console not only has a single box structure having a simple storage space, but also is mounted on a floor panel in a fixed state.

Furthermore, in the case of an autonomous electric vehicle commercially available in future, a flat panel may be applied as an indoor floor panel by virtue of elimination of an internal combustion engine and a drive shaft. In this regard, it may be possible to apply a mechanism for forwardly or rearwardly moving seats, on which a driver and a passenger will sit, or moving the seats to desired positions through swiveling of the seats. However, if the console is mounted on the floor panel in a fixed state, the console is spaced away from a seat when the seat moves forwards or rearwards. In this case, the occupant of the seat may have difficulty using the console and the armrest.

To this end, research is being conducted into various schemes for manufacturing a console having a structure capable of moving the console to positions where passengers on front and rear seats can use the console, respectively, and a structure capable of providing various convenience functions to the console in addition to an article storage function.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

The present disclosure relates to a half-movable console for a vehicle usable for various purposes within a limited passenger compartment in the vehicle through a configuration including a base console fixedly mounted to a floor panel, a moving console coupled to a top of the base console such that the moving console is slidable in forward and rearward directions, and a protector disposed at a front side of the moving console while being mounted to the base console such that the protector is movable in the forward and rearward directions while being adjustable in tilting angle.

In one aspect, the present disclosure provides a half-movable console for a vehicle including a base console mounted to a floor panel, a moving console coupled to a top of the base console such that the moving console is slidable in forward and rearward directions, the moving console having a structure defined with a storage space therein, and a protector having an upper portion connected to a front end of the moving console while having a lower portion coupled to the top of the base console such that the protector is slidable in the forward and rearward directions.

In a preferred embodiment, the base console may have a structure open at front and rear surfaces thereof and an upper surface thereof, to have opened front and rear spaces. Storage drawers may be slidably fitted in the opened front and rear spaces, respectively.

In another preferred embodiment, the moving console may include a storage box having a structure formed with an upwardly opened storage space while being coupled to the top of the base console such that the storage box is slidable in the forward and rearward directions, and an armrest coupled to a top of the storage box, to open or close the storage box.

In still another preferred embodiment, first sliding rails may be formed at an inner surface of an upper end of the base console, and first sliding protrusions may be formed at an outer surface of a lower end of the storage box such that the first sliding protrusions are slidably engaged with corresponding ones of the first sliding rails, respectively.

In yet another preferred embodiment, a bridge may extend from a front end of the armrest while being integrated with the armrest, and concave cup holders for front seats may be formed at the bridge.

In still yet another preferred embodiment, a table for rear seats may be pivotally coupled to a rear end of the armrest by a hinge such that the table is flush with an upper surface of the armrest in an unused state while being deployed in the rearward direction upon use thereof.

In still yet another preferred embodiment, when the table for rear seats is rearwardly deployed, the storage space of the moving console may be outwardly exposed, and a cup holder for rear seats may be separably held on a top of the outwardly exposed storage space.

In still yet another preferred embodiment, auxiliary tables may be pivotally coupled to opposite sides of the table for rear seats by hinges, respectively, to increase a table area.

In still yet another preferred embodiment, the protector may include a control panel body formed with a receiving space rearwardly opened to receive the bridge of the armrest, and a protector bar having an upper end connected to a lower portion of the control panel body while having a lower end formed with second sliding protrusions slidably engaged with second sliding rails formed at an upper surface of the base console, respectively.

In still yet another preferred embodiment, the protector may include a control panel body formed with a receiving space rearwardly opened to receive the bridge of the armrest, and angle-adjusting cylinders pivotally mounted to an upper surface of a front portion of the base console, for adjustment of a tilting angle of the control panel body. Each angle-adjusting cylinder may be provided with a piston rod pivotally connected to a bottom of the control panel body by a hinge. Hinge pins may be formed at an inner surface of the receiving space of the control panel body, and sliding grooves may be formed at opposite side surfaces of the bridge such that the hinge pins are slidably and rotatably engaged with the sliding grooves, respectively.

Other aspects and preferred embodiments of the disclosure are discussed infra.

It is understood that the terms "vehicle", "vehicular" and other similar terms as used herein are inclusive of motor vehicles in general such as passenger automobiles including sport utility vehicles (SUVs), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel (e.g. fuels derived from resources other than petroleum) vehicles. As referred to herein, a hybrid electric vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below.

FIGS. 1 to 4 are perspective views illustrating a half-movable console for a vehicle according to the present disclosure. As can be seen from the drawings, the half-movable console of the present disclosure is divided into a total of three pieces, that is, a base console 10, a moving console 20 and a protector 30.

Figure 1:
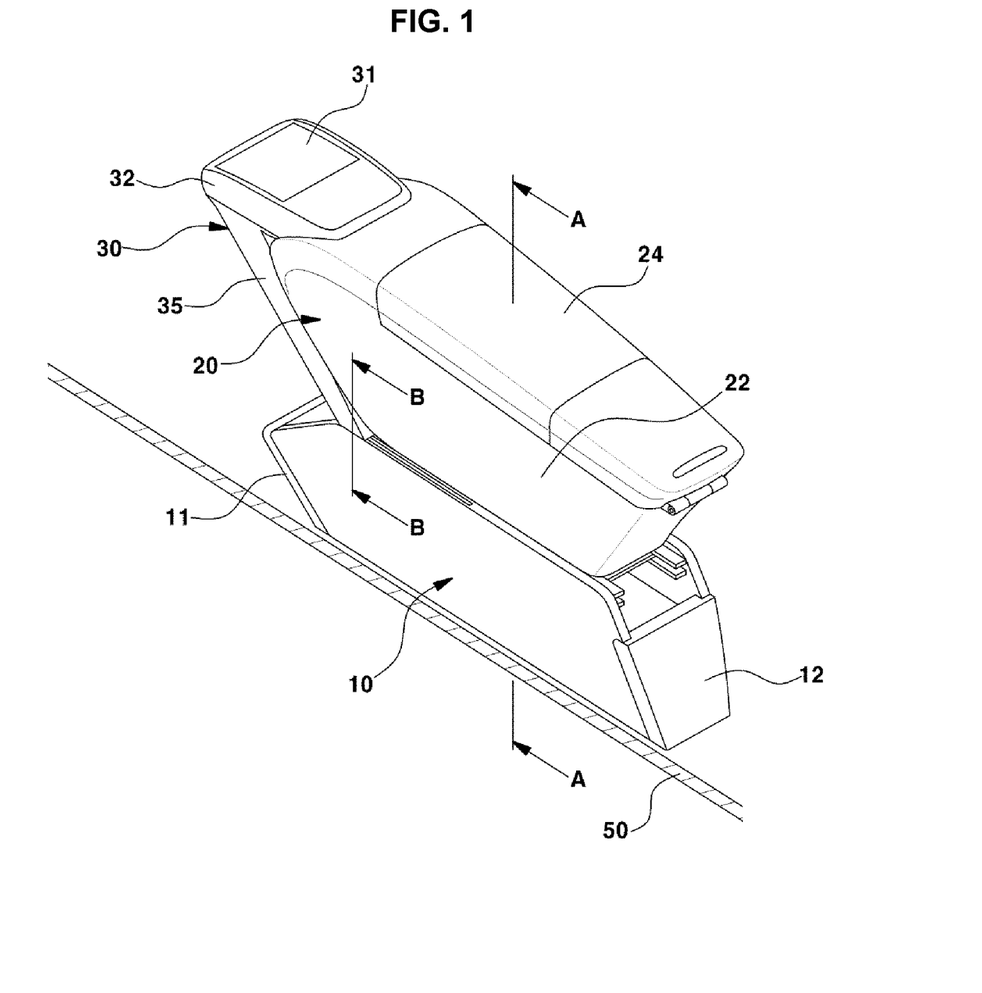
FIG. 1 is a perspective view illustrating a half-movable console for a vehicle according to the present disclosure.

The base console 10 is fixedly mounted to a floor panel 50.

Preferably, the base console 10 is fixedly mounted on a flat portion of the floor panel 50 between a driver seat and a front passenger seat.

Figure 2:
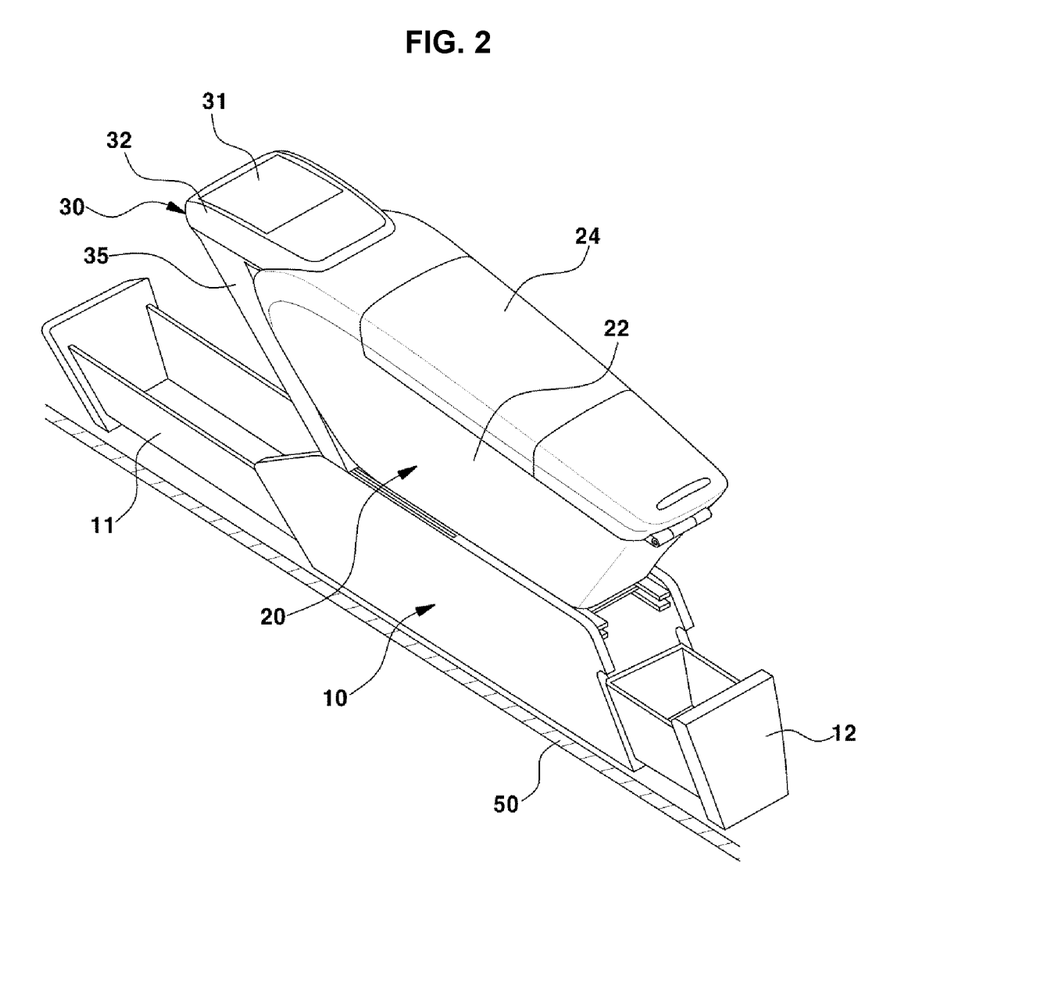
FIG. 2 is a perspective view illustrating an ejected state of a storage drawer included in the half-movable console according to the present disclosure.

In more detail, the base console 10 has a structure opened in forward and rearward directions while being upwardly opened, and is fixedly mounted on the floor panel between the driver seat and the front passenger seat. As illustrated in FIG. 2, storage drawers 11 and 12 are slidably fitted in opened front and rear spaces of the base console 10, respectively.

The moving console 20 has a structure defined with a storage space therein. The moving console 20 is coupled to the top of the base console 10 such that the moving console 20 is slidable in forward and rearward directions.

In more detail, the moving console 20 includes a storage box 22 having a structure formed with an upwardly opened storage space 21 while being coupled to the top of the base console 10 such that the storage box 22 is slidable in forward and rearward directions, and an armrest 24 coupled to the top of the storage box 22, to open or close the storage box 22.

Figure 5A:
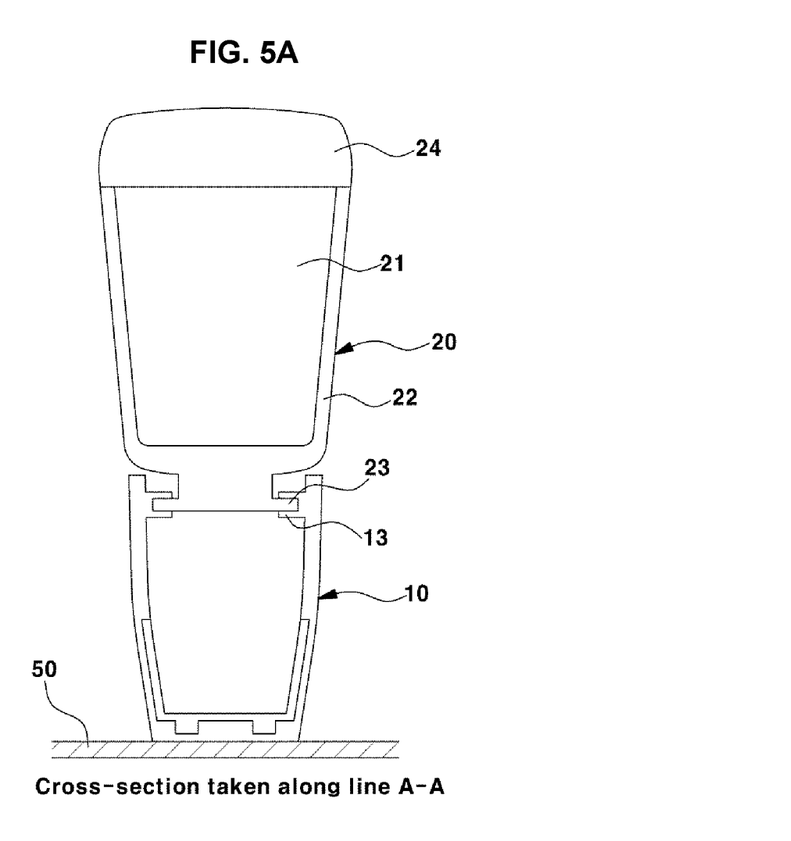
FIG. 5A is a cross-sectional view illustrating coupling structures of a base console and the moving console included in the half-movable console according to the present disclosure.

Preferably, for slidable movement of the moving console 20 on the base console 10 in forward and rearward directions, as illustrated in FIG. 5A, first sliding rails 13 are formed at an inner surface of an upper end of the base console 10, and first sliding protrusions 23 are formed at an outer surface of a lower end of the storage box 22 such that the first sliding protrusions 23 are slidably engaged with corresponding ones of the first sliding rails 13, respectively.

Accordingly, when the moving console 20 is rearwardly pushed, the first sliding protrusions 23 slide along the corresponding first sliding rails 13. As a result, the moving console 20 on the base console 10 has been moved to a rear side (toward passengers on the rear seats).

Meanwhile, a bridge 25 extends from a front end of the armrest 24 while being integrated with the armrest 24. The bridge 25 is coupled to a lower portion of a control panel body 32 included in the protector 30 such that the bridge 25 is insertable into a receiving space 33 formed at the lower portion of the control panel body 32. Concave cup holders 26 for front seats are formed at an upper surface of the bridge 25.

Figure 3:
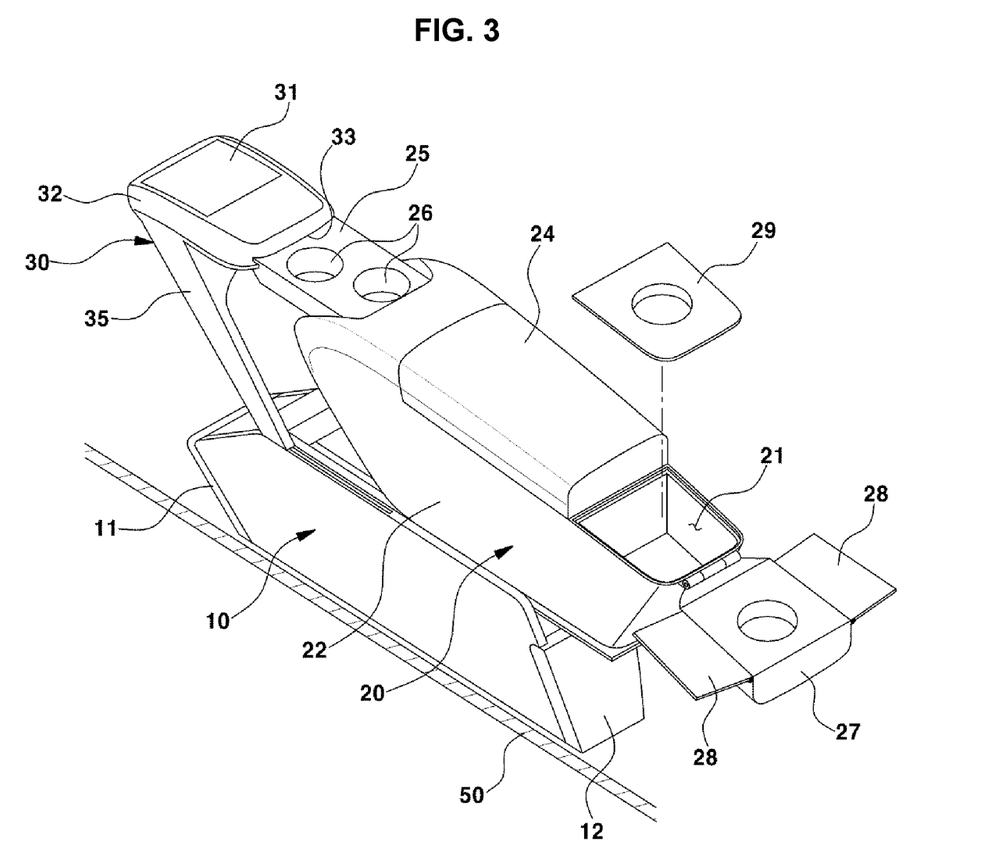
FIG. 3 is a perspective view illustrating a deployed state of a table after a moving console included in the half-movable console according to the present disclosure moves rearwards.

Accordingly, when the moving console 20 moves rearwards, the bridge 25 is ejected from the receiving space 22 of the control panel body 32, as illustrated in FIG. 3, and, as such, the driver and the passenger on the front seats may use the concave cup holders 26 for front seats formed at the upper surface of the bridge 25.

In addition, a table 27 for rear seats is pivotally coupled to a rear end of the armrest 24 by a hinge such that the table 27 is flush with an upper surface of the armrest 24 in an unused state while being deployed in a rearward direction upon use thereof, as illustrated in FIG. 3. Furthermore, auxiliary tables 28 are pivotally coupled to opposite sides of the table 27 for rear seats by hinges, respectively, in order to increase a table area for use convenience.

Preferably, when the table 27 for rear seats is rearwardly deployed, the storage space 21 of the moving console 20 is outwardly exposed to be opened. In this state, a cup holder 29 for rear seats may be separably held on the top of the opened storage space 21.

Accordingly, passengers on the rear seats may conveniently use the table 27 for rear seats and the auxiliary tables 28 by rearwardly moving the moving console 20, and then deploying the table 27 for rear seats and the auxiliary tables 28.

The protector 30 may function as a control panel for manipulation of various devices of the vehicle by the driver, a partition dividing the driver seat and the front passenger seat from each other, and a knee rest on which knee portions of the driver and the passenger on the front seats rest comfortably.

In addition, the protector 30 is coupled to the top of the base console 10 such that the protector 30 is slidable in a rear direction in order to secure a wide space between the driver seat and the front passenger seat.

To this end, the protector 30 has a structure having an upper portion connected to a front end of the moving console 20 while having a lower portion slidably coupled to the top of the base console 10.

In more detail, the protector 30 includes the control panel body 32, which is formed, at a lower portion thereof, with the receiving space 33 rearwardly opened to receive the bridge 25 of the armrest 24. The protector 30 also includes a protector bar 35 having an upper end connected to the lower portion of the control panel body 32 while having a lower end slidably coupled to the top of the base console 10 such that the protector bar 35 is slidable in forward and rearward directions.

A control panel 31 including buttons and switches for controlling various devices of the vehicle is mounted on an upper surface of the control panel body 32.

Figure 5B:
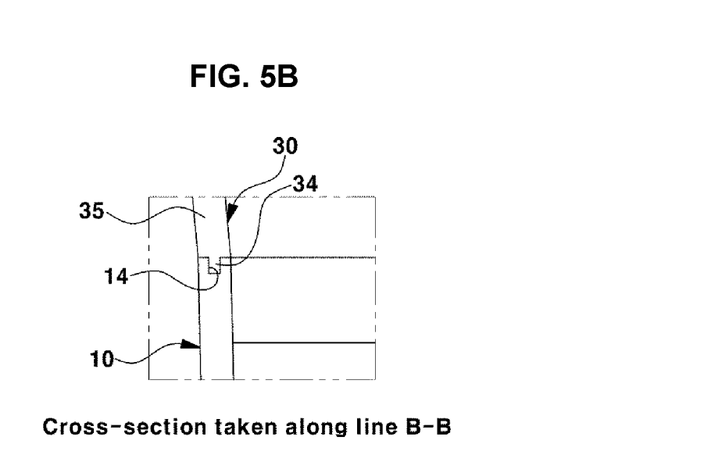
FIG. 5B is a cross-sectional view illustrating coupling structures of the base console and the protector included in the half-movable console according to the present disclosure.

Preferably, as a configuration for forward and rearward movement of the protector 30, as illustrated in FIG. 5B, second sliding rails 14 are formed at an upper surface of the base console 10, and second sliding protrusions 34 are formed at a lower portion of the protector bar 35 such that the second sliding protrusions 34 are slidably engaged with corresponding ones of the second sliding rails 14, respectively.

Figure 4:
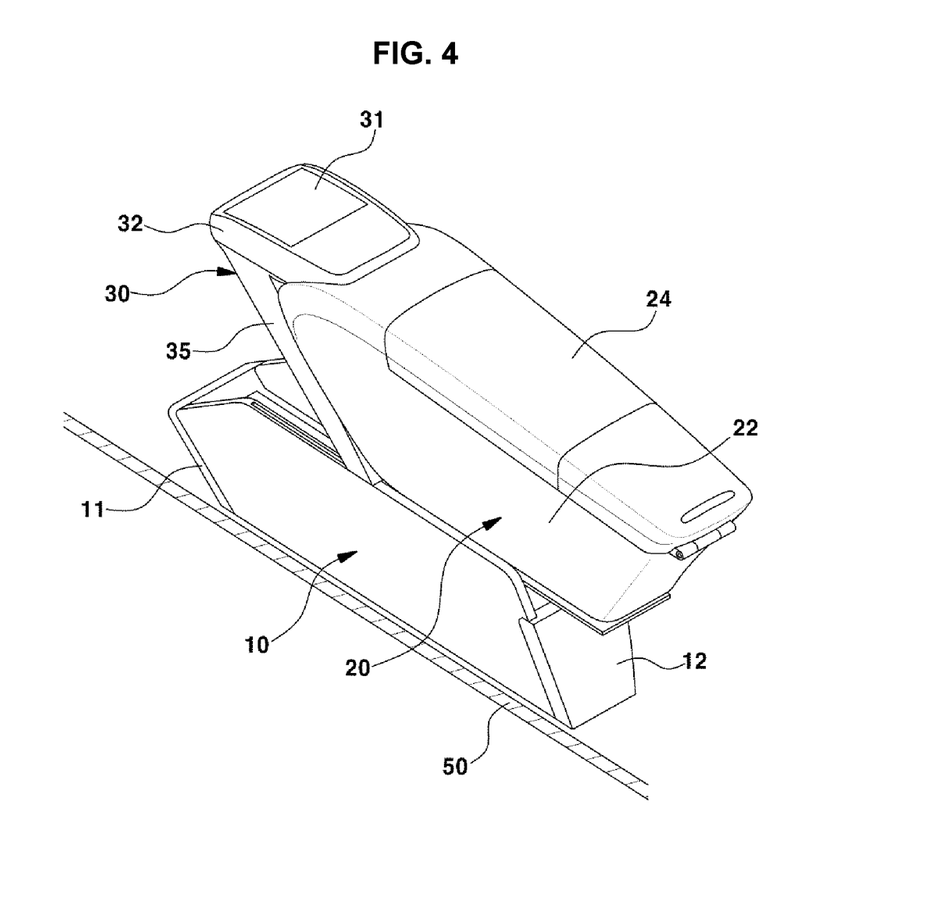
FIG. 4 is a perspective view illustrating rearward movement states of the moving console and a protector included in the half-movable console according to the present disclosure.

Accordingly, when the protector 30 is rearwardly pushed after rearward movement of the moving console 20, the second sliding protrusions 34 slide rearwards along the corresponding second sliding rails 14. As a result, the protector 30 has been rearwardly moved together with the moving console 20, as illustrated in FIG. 4.

Hereinafter, operation states and use states of the half-movable console for vehicles having the above-described configuration according to the present disclosure will be described.

User Convenience Mode

Figure 6A:
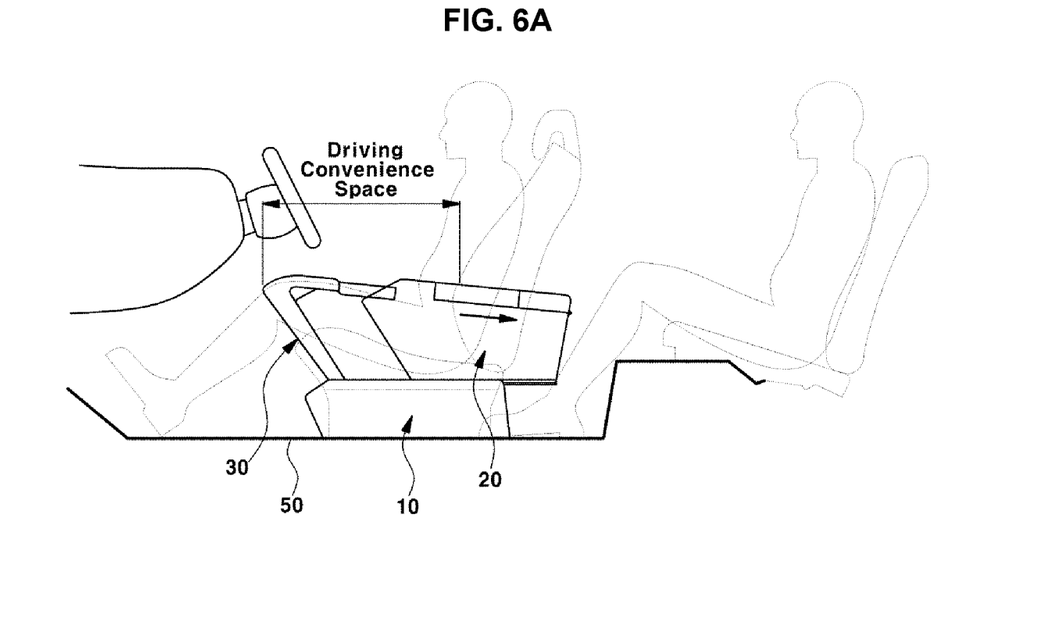
FIGS. 6A, 6B, and 6C are views illustrating a driver convenience mode of the half-movable console according to the present disclosure.
Figure 6B:
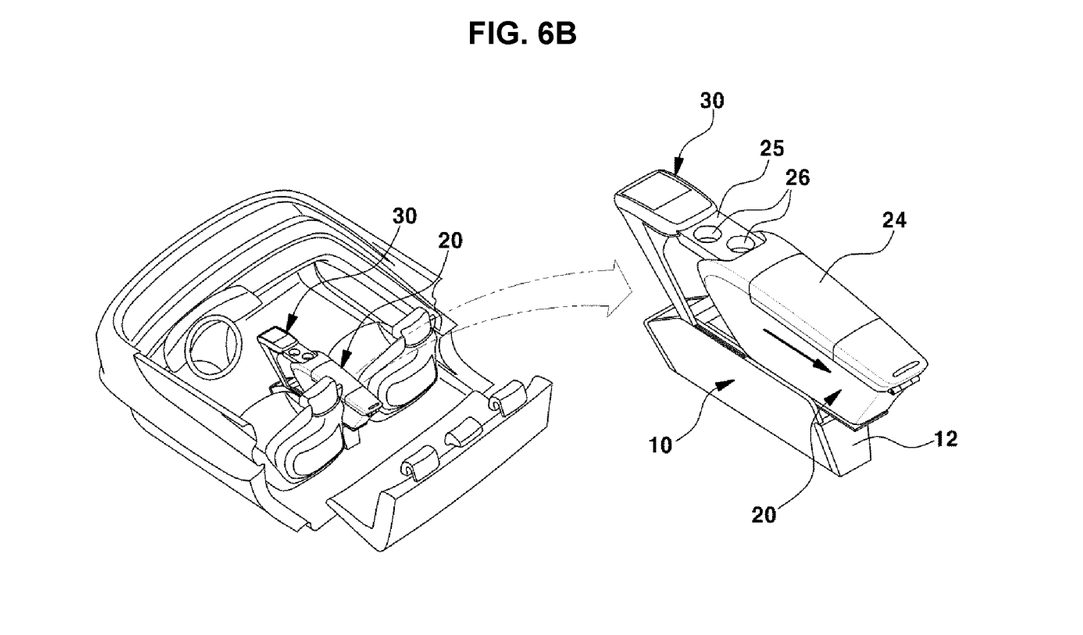
Figure 6C:
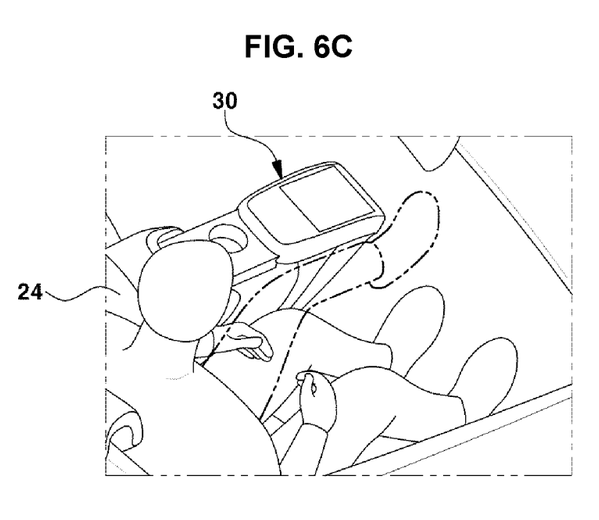

FIGS. 6A to 6C illustrate a user convenience mode of the half-movable console according to the present disclosure.

When the moving console 20 is rearwardly pushed, the first sliding protrusions 23 slide along the corresponding first sliding rails 13. As a result, the moving console 20 on the base console 10 has been rearwardly moved, as illustrated in FIGS. 6A and 6B.

At the same time, the bridge 25 is ejected from the receiving space 33 of the control panel body 32 and, as such, the driver and the passenger on the front seats may use the concave cup holders 26 for front seats formed at the upper surface of the bridge 25.

Of course, the driver and the passenger on the front seats may stow or retrieve articles in or from the storage space 21 of the moving console 20 after opening the armrest 24.

At this time, the protector 30 does not move rearwards and, as such, is maintained at a foremost position of the base console 10.

Accordingly, as illustrated in FIG. 6C, the protector bar 35 of the protector 30 may function as a knee rest on which knee portions of the driver and the passenger on the front seats rest comfortably. The protector bar 35 may also function as a protector for preventing the passenger on the front passenger seat from accessing an accelerator pedal or a brake pedal, thereby preventing erroneous operation of the accelerator pedal or the brake pedal. Thus, it may be possible to secure safe driving.

Rear Seat Convenience Mode

Figure 7A:
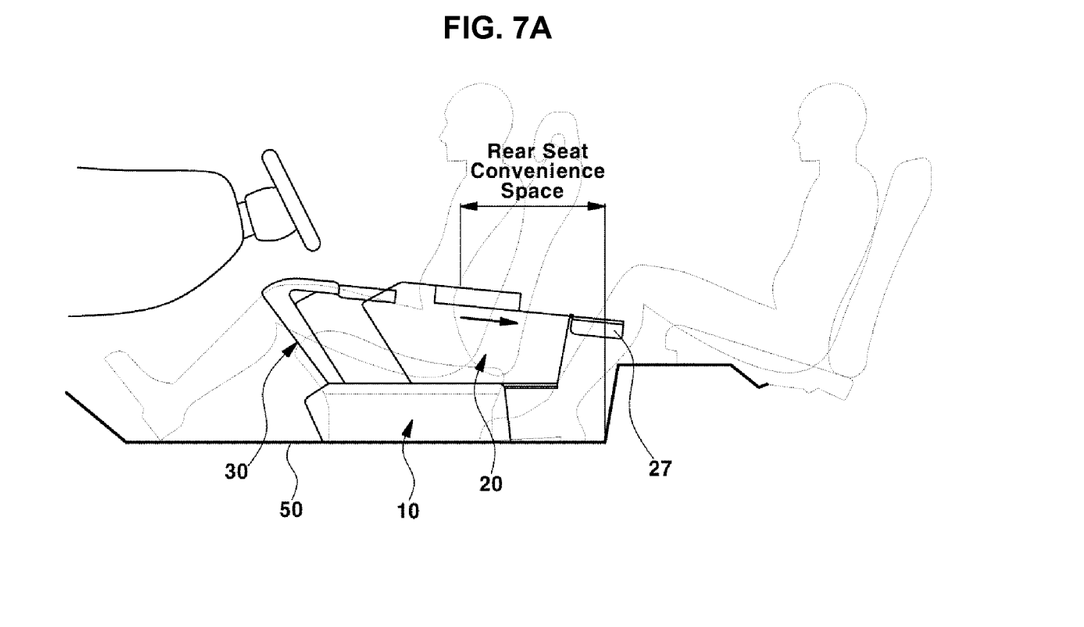
FIGS. 7A and 7B are views illustrating a rear seat convenience mode of the half-movable console according to the present disclosure.
Figure 7B:
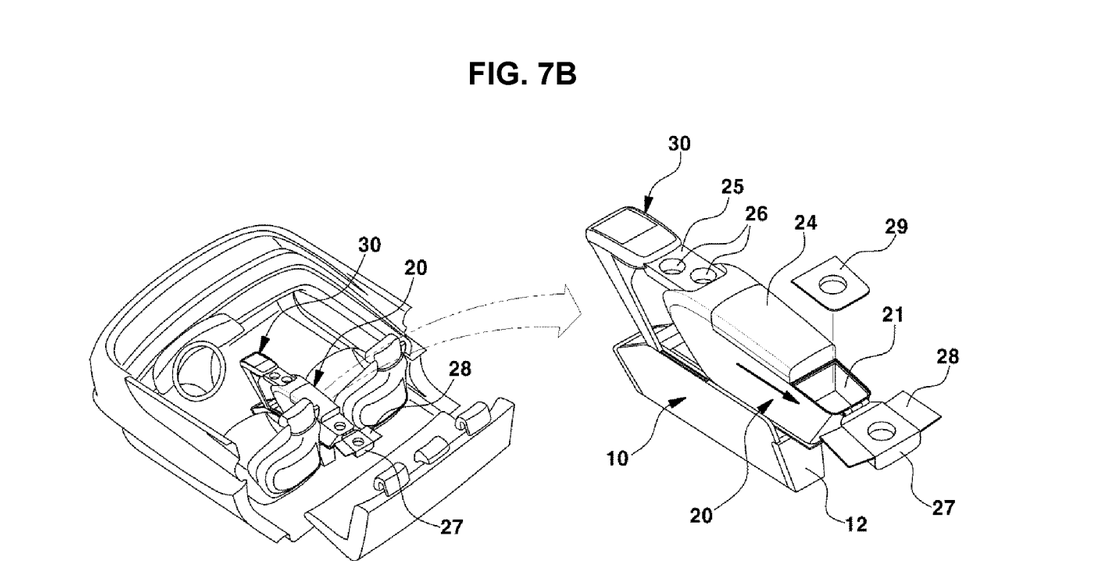

FIGS. 7A and 7B illustrate a rear seat convenience mode of the half-movable console according to the present disclosure.

After rear movement of the moving console 20 as described above, the table 27 for rear seats mounted to the rear end of the armrest 24 is rearwardly deployed. Subsequently, the auxiliary tables 28 mounted to opposite sides of the table 27 for rear seats are laterally deployed.

Simultaneously with rearward deploy of the table 27 for rear seats, the cup holder 29 for rear seats held at the top of the storage space 21 of the moving console 20 is outwardly exposed.

Accordingly, passengers on the rear seats may not only conveniently use the table 27 for rear seats and the auxiliary table 28, but also conveniently use the cup holder 29 for rear seats.

In addition, when the cup holder 29 for rear seats is lifted, the storage space 21 of the moving console 20 is opened. Accordingly, the passengers on the rear seats may conveniently stow articles, and may easily retrieve the articles from the storage space 21.

Front Seat Walkthrough Mode & Front-Rear Seat Communication Mode

Figure 8A:
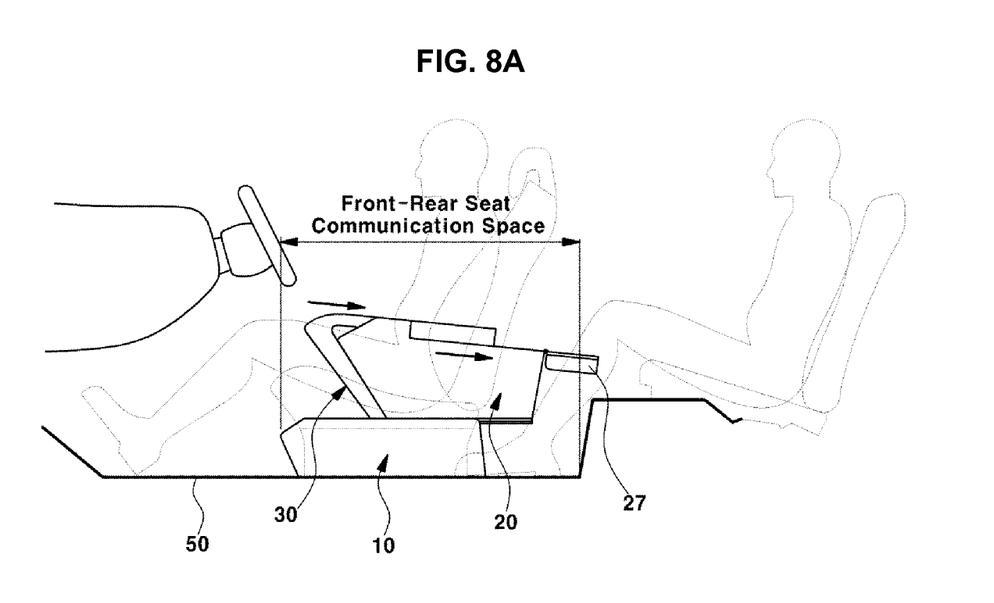
FIGS. 8A and 8B are views illustrating a front seat walkthrough mode and a front-rear seat communication mode of the half-movable console according to the present disclosure.
Figure 8B:
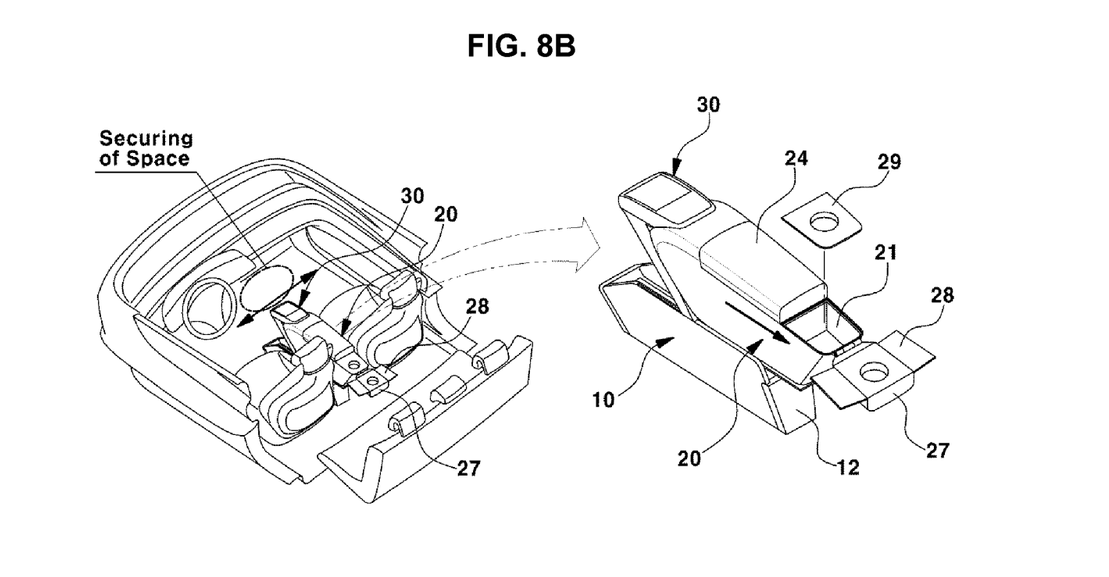

FIGS. 8A and 8B illustrate a front seat walkthrough mode and a front-rear seat communication mode of the half-movable console according to the present disclosure.

The front seat walkthrough mode means a mode for securing an aisle between the driver seat and the front passenger seat, whereas the front-rear seat communication mode means a mode for partially swiveling the driver seat and the front passenger seat, thereby enabling the driver and the passenger on the front seats to communicate or talk with the passengers on the rear seats.

For these modes, after rearward movement of the moving console 20 as described above, the protector 30 is rearwardly pushed. Accordingly, the second sliding protrusions 24 are rearwardly moved along the second sliding rails 14 and, as such, the protector 30 has been rearwardly moved, together with the moving console 20.

Accordingly, an aisle may be secured between the driver seat and the front passenger seat, and a track enabling partial swivel of the driver seat and the front passenger seat toward each other may be secured.

That is, since the protector 30 has moved rearwards, the driver seat and the front passenger seat do not interfere with the protector 30 during partial swivel thereof and, as such, it may be possible to easily swivel the driver seat and the front passenger seat toward each other.

Accordingly, the front-rear seat communication mode enabling the driver and the passenger on the front seats to communicate or talk with the passengers on the rear seats may be obtained in accordance with partial swivel of the driver seat and the front passenger seat.

Rear Seat Walkthrough Mode

Figure 9A:
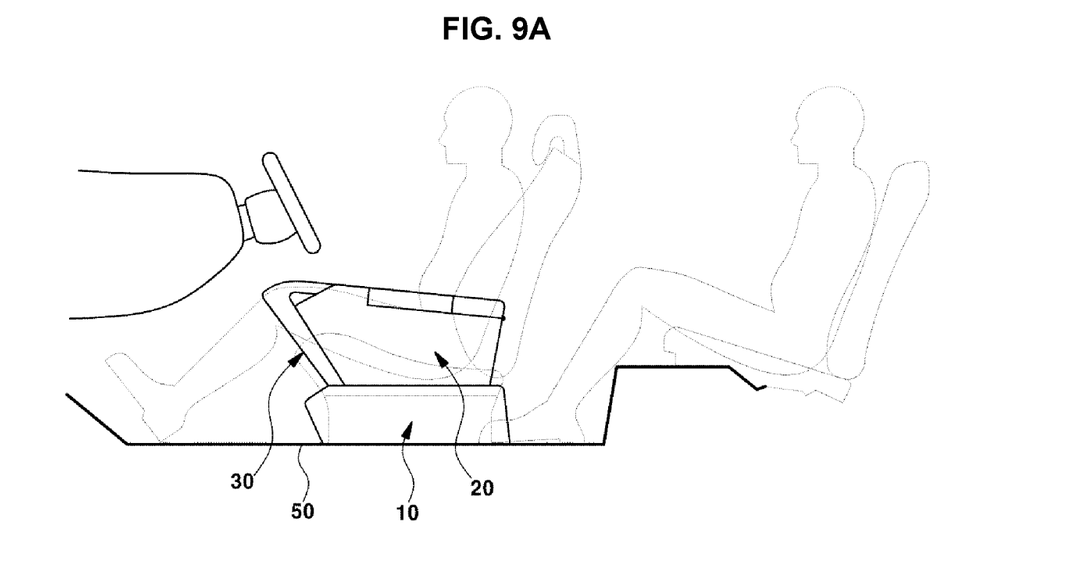
FIGS. 9A and 9B are views illustrating a rear seat walkthrough mode of the half-movable console according to the present disclosure.
Figure 9B:
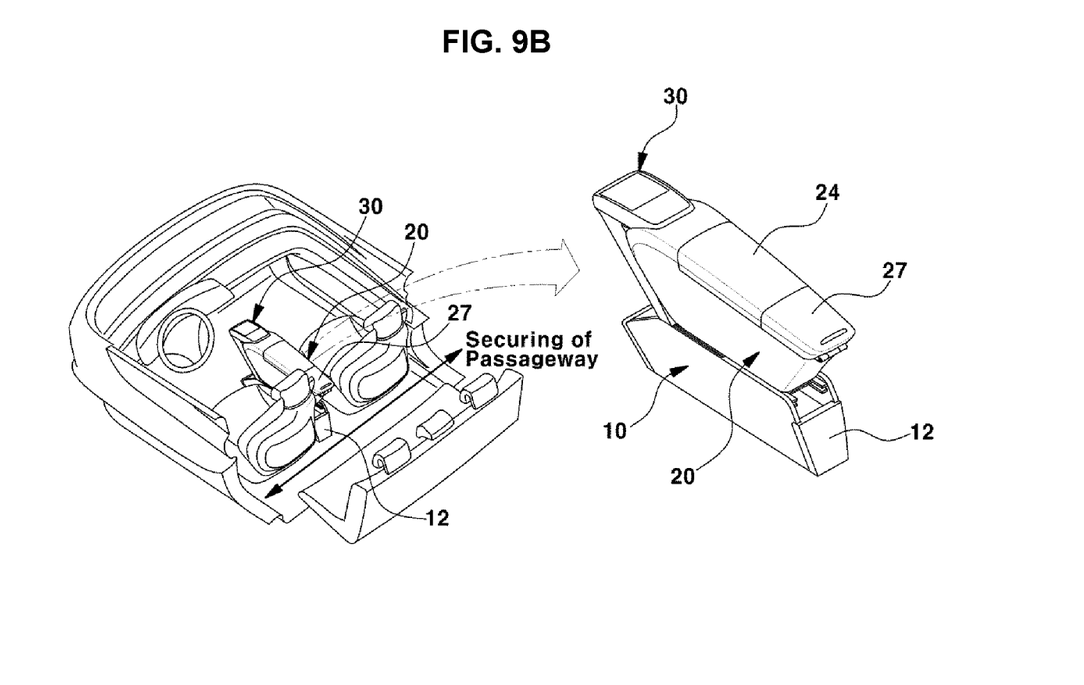

FIGS. 9A and 9B illustrate a rear seat walkthrough mode of the half-movable console according to the present disclosure.

The rear seat walkthrough mode means a mode enabling easy entrance or exit of passengers at the side of the rear seats through forward movement of the moving console 20.

For this mode, as illustrated in FIGS. 9A and 9B, the protector 30 is forwardly pushed. At the same time, the moving console 20 is also forwardly moved such that the moving console 20 is disposed at a foremost position.

Accordingly, the moving console 20 is positioned to be hidden between the driver seat and the front passenger seat and, as such, a wide rear seat passageway is secured. Thus, easy entrance or exit of passengers at the side of the rear seats may be achieved.

Meanwhile, the protector 30 may be configured to adjust a tilting angle of the control panel body 32 to an angle desired by the driver for convenient manipulation of the control panel 31. Accordingly, the driver may easily manipulate various buttons and switches of the control panel 31 mounted on the control panel body 32 while maintaining a comfortable posture.

Figure 10A:
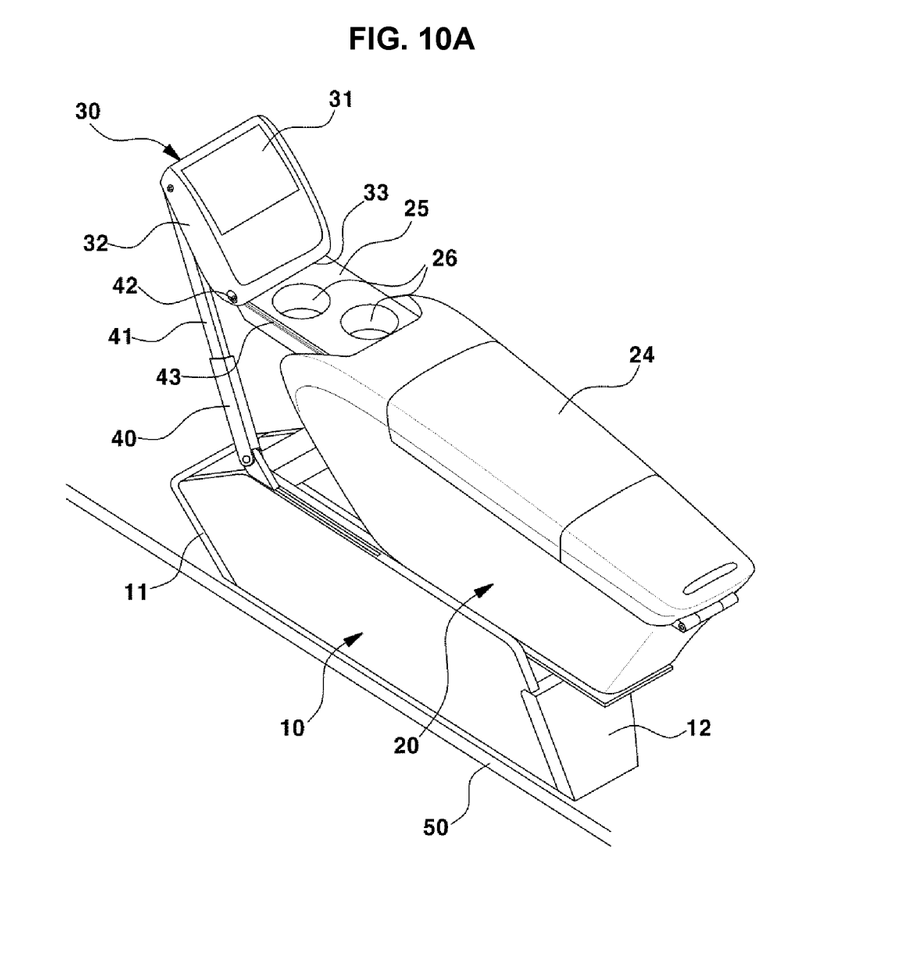
FIGS. 10A and 10B are lateral sectional views illustrating an embodiment of a tilting angle adjuster for a control panel body included in the half-movable console according to the present disclosure.
Figure 10B:
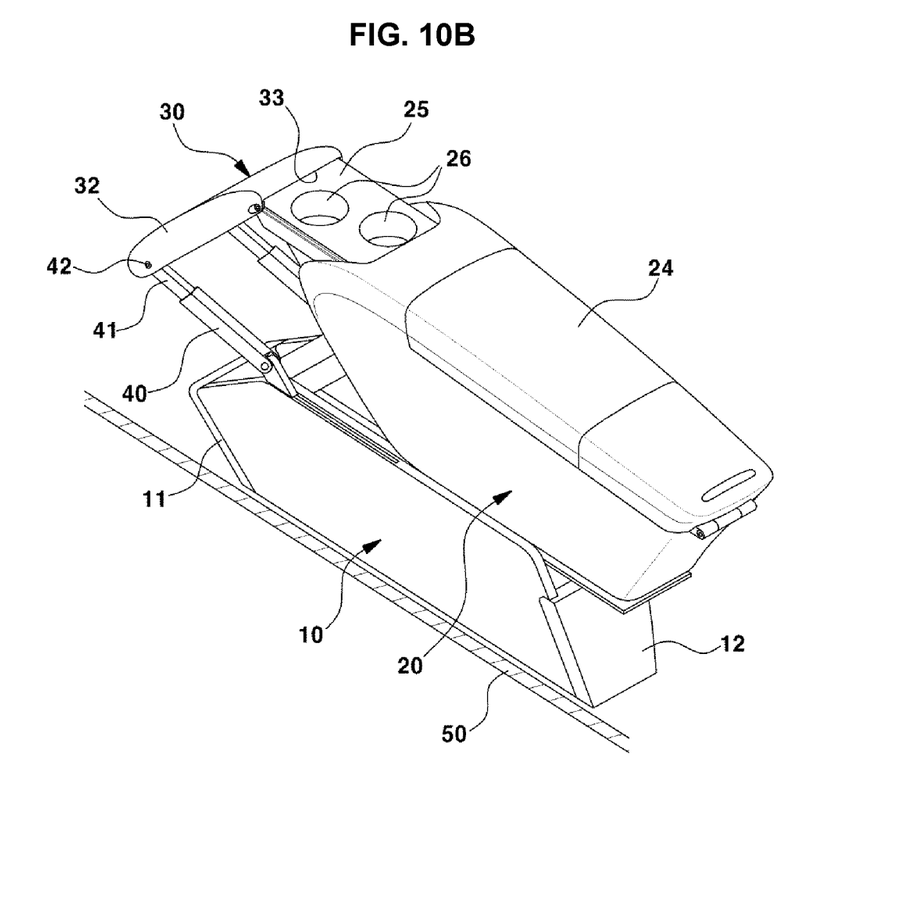

To this end, as illustrated in FIGS. 10A and 10B, the protector 30 includes the control panel body 32, which is formed, at the lower portion thereof, with the receiving space 33 rearwardly open to receive the bridge 25 of the armrest 24, and angle-adjusting cylinders 40 pivotally mounted to an upper surface of a front portion of the base console 10, for adjustment of the tilting angle of the control panel body 32.

In more detail, a piston rod 41 of each angle-adjusting cylinder 40 is pivotally connected to the bottom of the control panel body 32 by a hinge. Hinge pins 42 are also formed at an inner surface of the receiving space 33 of the control panel body 32. Sliding grooves 43 are formed at opposite side surfaces of the bridge 25 such that the hinge pins 42 are slidably and rotatably engaged with the sliding grooves 43, respectively.

When the piston rod 41 of each angle-adjusting cylinder 40 extends upwards after the moving console 20 is rearwardly pushed, and the bridge 25 is ejected from the receiving space 33 of the control panel body 32, as illustrated in FIG. 10A, the piston rod 41 upwardly pushes the control panel body 32. Accordingly, the control panel body 32 rotates upwards about the hinge pins 42 engaged in the sliding grooves 43 and, as such, the tilting angle of the control panel body 32 may be adjusted to an angle desired by the driver.

Thus, the driver may easily manipulate various buttons, switches, etc. included in the control panel 31 of the control panel body 32 in a state in which the drivers arm rests on the armrest 24.

On the other hand, as illustrated in FIG. 10B, when the piston rod 41 of each angle-adjusting cylinder 40 is downwardly retracted, the piston rod 41 downwardly pulls the control panel body 32. As a result, the control panel body 32 rotates downwards about the hinge pins 42 engaged in the sliding grooves 43 such that the control panel body 32 is moved to a non-use position. Thus, a wide passageway may be secured between the driver seat and the front passenger seat.

The present disclosure may provide the following effects in accordance with the illustrated embodiments, the above-described configurations, the combinations of the configurations, and use relations thereof.

First, the half-movable console is constituted by two pieces, that is, the base console fixedly mounted to the floor panel and the moving console slidably coupled to the top of the base console such that the moving console is slidable in forward and rearward directions. Accordingly, the half-movable console may be used in the limited passenger compartment of the vehicle, for various purposes.

Second, when the moving console slides rearwards from the base console, the bridge of the moving console formed with the cup holders for front seats is outwardly exposed. Accordingly, it may be possible to provide convenience of use of the cup holders to passengers for front seats.

Third, it may be possible to provide convenience of use of the table to passengers for rear seats by rearwardly sliding the moving console with respect to the base console, and then deploying the table provided at the rear end of the moving console. At this time, the cup holder hidden by the table is exposed and, as such, it may be possible to provide convenience of use of the cup holder to passengers for rear seats. When the cup holder for rear seats is lifted, the storage space of the moving console is opened and, as such, passengers for rear seats may conveniently use the storage space.

Fourth, the storage drawers may be withdrawn from the front and rear portions of the base console and, as such, a maximum storage space may be provided.

Fifth, the protector including the control panel body may be used not only for a knee rest for the driver and the passenger on the front seats, but also for a partition for partitioning the driver seat and the front passenger seat from each other.

Sixth, the tilting angle of the control panel body may be adjusted to an angle desired by the driver for convenient manipulation of the control panel. Accordingly, the driver may easily manipulate various buttons and switches of the control panel mounted on the control panel body while maintaining a comfortable posture.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A half-movable console for a vehicle comprising:
   a base console mounted to a floor panel;
   a moving console coupled to a top of the base console such that the moving console is slidable in forward and rearward directions, the moving console having a structure defined with a storage space therein; and
   a protector having an upper portion connected to a front end of the moving console while having a lower portion coupled to the top of the base console such that the protector is slidable in the forward and rearward directions.

2. The half-movable console according to claim 1, wherein the base console has a structure open at front and rear surfaces thereof and an upper surface thereof, to have opened front and rear spaces, and storage drawers are slidably fitted in the opened front and rear spaces, respectively.

3. The half-movable console according to claim 1, wherein the moving console comprises:
   a storage box having a structure formed with an upwardly opened storage space while being coupled to the top of the base console such that the storage box is slidable in the forward and rearward directions; and
   an armrest coupled to a top of the storage box, to open or close the storage box.

4. The half-movable console according to claim 1, wherein first sliding rails are formed at an inner surface of an upper end of the base console, and first sliding protrusions are formed at an outer surface of a lower end of the storage box such that the first sliding protrusions are slidably engaged with corresponding ones of the first sliding rails, respectively.

5. The half-movable console according to claim 1, wherein a bridge extends from a front end of an armrest while being integrated with the armrest, and concave cup holders for front seats are formed at the bridge.

6. The half-movable console according to claim 1, wherein a table for rear seats is pivotally coupled to a rear end of an armrest by a hinge such that the table is flush with an upper surface of the armrest in an unused state while being deployed in the rearward direction upon use thereof.

7. The half-movable console according to claim 6, wherein, when the table for rear seats is rearwardly deployed, the storage space of the moving console is outwardly exposed, and a cup holder for rear seats is separably held on a top of the outwardly exposed storage space.

8. The half-movable console according to claim 6, wherein auxiliary tables are pivotally coupled to opposite sides of the table for rear seats by hinges, respectively, to increase a table area.

9. The half-movable console according to claim 1, wherein the protector comprises:
   a control panel body formed with a receiving space rearwardly opened to receive a bridge of an armrest; and
   a protector bar having an upper end connected to a lower portion of the control panel body while having a lower end formed with second sliding protrusions slidably engaged with second sliding rails formed at an upper surface of the base console, respectively.

10. The half-movable console according to claim 1, wherein:
    the protector comprises
    a control panel body formed with a receiving space rearwardly opened to receive a bridge of an armrest; and
    angle-adjusting cylinders pivotally mounted to an upper surface of a front portion of the base console, for adjustment of a tilting angle of the control panel body,
    each of the angle-adjusting cylinders is provided with a piston rod pivotally connected to a bottom of the control panel body by a hinge.

11. The half-movable console according to claim 10, wherein hinge pins are formed at an inner surface of the receiving space of the control panel body, and sliding grooves are formed at opposite side surfaces of the bridge such that the hinge pins are slidably and rotatably engaged with the sliding grooves, respectively.

* * * * *